Oct. 12, 1948.　　　　E. M. BUTLER　　　　2,451,065

ELECTROLYTIC WATER CORRECTION DEVICE

Filed May 29, 1946

Inventor
EDGAR M. BUTLER

Patented Oct. 12, 1948

2,451,065

UNITED STATES PATENT OFFICE 2,451,065

ELECTROLYTIC WATER CORRECTION DEVICE

Edgar M. Butler, New Orleans, La.

Application May 29, 1946, Serial No. 672,986

2 Claims. (Cl. 204—248)

This invention relates to an electrolytic water correction device, and more particularly to a self-energizing electrolytic water correction device for use in vessels of small capacity for the heating of water, such as water kettles, domestic hot water tanks and the like.

The device of my present invention comprises a cartridge, or core, which is preferably cylindrical in form, composed of a metal that is negative in the electromotive series, and a perforate casing therefor composed of a metal that is positive with respect to the metal of the core. Preferably, the perforate casing is provided with closed end sockets for receiving and retaining the ends of the core, with the intermediate wall portions of the casing spaced from the core. The intermediate portion of the core is preferably wound with a tight helical wire spring, also formed of a metal positive to the metal of the core, which due to its resiliency grips the core strongly and insures good electrical contact with the metal of the core as the core expands or contracts in use.

An electrolytic action is thus set up in use between the negative metal of the core and the positive metals of the helical spring enclosing the core and of the perforate casing enclosing both. In the presence of "hard" water, the electrolytic action has the function of preventing the deposition of a hard, adherent scale on the inner wall of the vessel in which the self-energizing electrolytic device is installed. This electrolytic action and the function performed thereby are more fully explained in my issued Patents Nos. 2,321,796; 2,321,797; 2,337,151 and 2,348,882, and various of my pending applications.

It is therefore an important object of this invention to provide a self-energizing electrolytic water correction device of simple yet effective construction wherein good electrical contact is insured at all times during use between the negative metal core and a positive metal sheath therefor.

It is a further important object of this invention to provide a self-energizing electrolytic water correction device for use in water heating vessels of small capacity, wherein the device is in the form of a self-contained unit that may be dropped into the vessel to rest on the bottom thereof without being secured in any fixed position in the vessel.

Other and further important objects of this invention will be apparent from the disclosures in the specification and the accompanying drawings.

Figure 1:
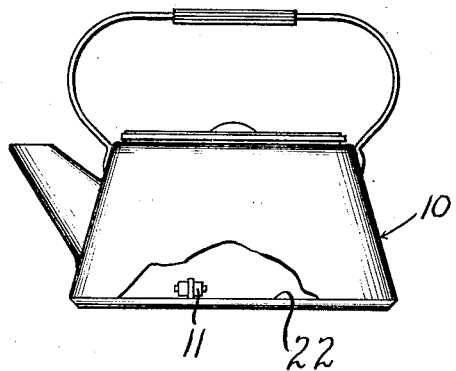
Figure 1 is an elevational view of a water kettle, with a portion of the wall thereof broken away to illustrate the positioning therein of a self-energizing electrolytic water correction device embodying the principles of my present invention.
Figure 2:
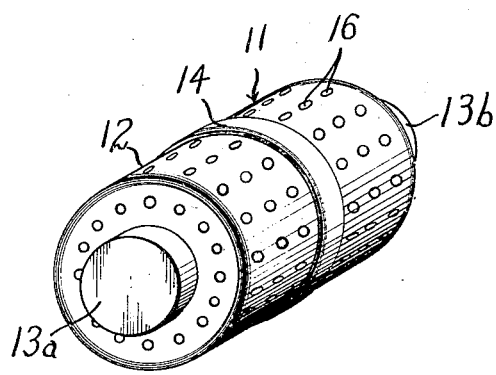
Figure 2 is a perspective view of the device itself.
Figure 3:
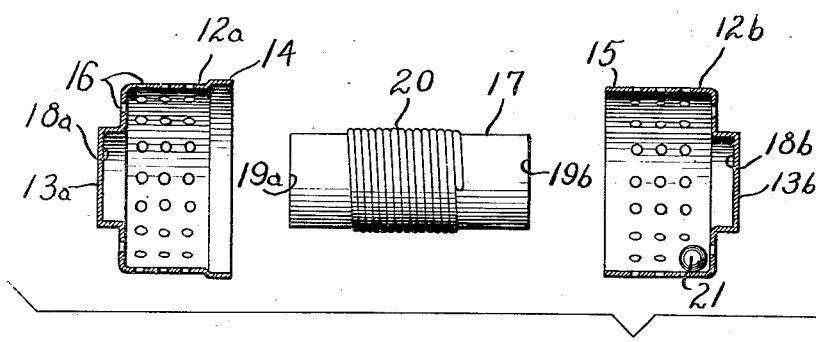
Figure 3 is an exploded, longitudinal cross-sectional view of the device, before assembly, with parts thereof in elevation.
Figure 4:
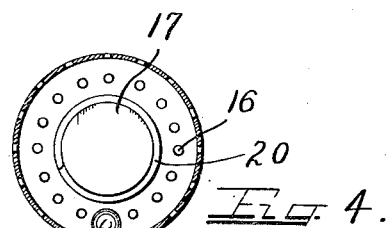
Figure 4 is a transverse sectional view of the device, with parts in elevation.

The reference numeral 10 indicates generally a vessel, such as a water kettle, for heating water for domestic purposes. A self-energizing electrolytic water correction device, embodying the principles of my invention and indicated by the reference numeral 11 is shown as positioned within said vessel 10 to rest on the bottom thereof for free movement therein.

Said device 11 comprises a perforate casing 12, formed in two parts, such as the parts 12a and 12b, and provided with closed cylindrical end sockets 13a and 13b of reduced diameter with respect to the intermediate cylindrical wall of the casing. The casing part 12a is provided with an open outwardly offset annular portion 14 for receiving the open end 15 of the casing part 12b. After insertion of the open end 15 within the annular portion, said annular portion is shrunk or spun in to provide a tight permanent joint therebetween.

The perforate casing 12 may suitably be formed of sheet metal with a plurality of perforations, indicated at 16 in both the cylindrical wall and the end walls of the casing parts 12a and 12b. The metal of which the casing is formed is suitably copper, or a copper-plated or silver-plated foundation metal. These metals are referred to as positive metals, since they are lower in the electromotive force series than hydrogen.

The casing 12 is for the purpose of encasing and supporting a core 17, which is preferably cylindrical, and is formed of a negative metal, such as zinc. The ends of the core 17 are of such diameter as to fit snugly within the closed end sockets 13a and 13b to be mechanically retained therein by a press fit. As so retained, the intermediate portion of the core 17 is spaced from the intermediate walls of the casing 12.

In order to insure good electrical contact between the casing 12 and core, or cartridge, 17, the end sockets 13a and 13b are provided with flat end walls 18a and 18b for close contact with the plane surfaces 19a and 19b of the cartridge ends. The perforations 16 are for the purpose of allowing free water circulation through the interior of the casing 12.

In order to provide additional contact areas between the negative and positive elements, that is, to produce a greater active area in the device, a tightly wound helical spring 20 is mounted upon the intermediate portion of the cylindrical cartridge 17. Said spring 20 may suitably be formed of spring brass, or other metal or alloy that is positive with respect to the metal of the cartridge itself. Since the spring 20 is initially of a diameter less than that of the core 17, said spring must be expanded to receive the core 17. The spring then contracts of its own resiliency to grip the surface of the core 17 and provide good electrical contact therewith. An advantage of the spring construction is that if, through decomposition of the metal of the cartridge 17, contact between the ends 19a and 19b and the closed end sockets 13a and 13b of the casing 12 lost, electrolytic action will continue between the metal of the core 17 and that of the spring 20. Furthermore, the spring 20 will shrink or contract as the cartridge contracts, or will expand as the cartridge expands, thereby insuring good electrical contact during the entire life of the cartridge 17.

A small steel ball 21 is positioned within the casing 12 for the purpose of knocking off corrosion products formed on the surface of the cartridge 17 during use, and thereby maintaining a clean surface for more effective electrolytic action. It will be understood that the ball 21, being free to move within the casing 12, will bump around due to the heating of the water within the vessel 10, and especially is this true if the water is brought to a boil.

To use the device above described, the assembled unit is merely dropped into the vessel, such as the water kettle 10, and retained therein until the cartridge 17 is substantially consumed. The mere presence of the device in the water vessel suffices to reduce, or even to eliminate entirely, the formation of a hard, adherent scale within the water vessel, and particularly upon the bottom wall 22, upon which the device normally rests. Because of the electrolytic action that is set up due to the presence of scale-forming salts in most waters, a relatively soft sludge, rather than an adherent scale, is produced, and this sludge may be readily flushed out periodically.

The term "positive" as used herein designates metals positioned below hydrogen in the electromotive force series of metals. The term "negative" as used herein designates metals positioned above hydrogen in the electromotive force series of metals.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an electrolytic water correction device, the combination with a perforate two-part cage having closed end sockets of a cylindrical core of negative metal encased within and press-fitted into said end sockets to be supported by said cage, and a tightly wound helical spring of positive metal surrounding an intermediate length only of said core and resiliently gripping said core to insure good electrical contact therewith during expansion and contraction of said core.

2. An electrolytic water correction device comprising cylindrical core of negative metal, a perforate housing having closed cylindrical end sockets for snugly receiving the ends of said core to support the same and a tightly wound helical spring of positive metal mounted on and resiliently gripping the intermediate portion of said core.

EDGAR M. BUTLER.

REFERENCES CITED

The following references are of record in the file of this patent:

UNITED STATES PATENTS

| Number | Name | Date |
|---|---|---|
| 435,518 | Pollack | Sept. 2, 1890 |
| 577,134 | Harrison | Feb. 16, 1897 |
| 2,058,370 | Thompson | Oct. 20, 1936 |
| 2,321,796 | Butler | June 15, 1943 |